(12) United States Patent
Marupaduga

(10) Patent No.: US 11,950,271 B1
(45) Date of Patent: Apr. 2, 2024

(54) LIMITING UPLINK NOISE BY ADJUSTING MIMO TRANSMISSION LAYERS

(71) Applicant: Sprint Spectrum LP, Overland Park, KS (US)

(72) Inventor: Sreekar Marupaduga, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 289 days.

(21) Appl. No.: 17/064,987

(22) Filed: Oct. 7, 2020

(51) Int. Cl.
*H04W 72/542* (2023.01)
*H04B 7/04* (2017.01)
*H04B 7/0413* (2017.01)
*H04B 17/318* (2015.01)
*H04L 43/16* (2022.01)
*H04W 8/24* (2009.01)
*H04W 24/08* (2009.01)
*H04W 72/51* (2023.01)
*H04W 88/06* (2009.01)

(52) U.S. Cl.
CPC ........ *H04W 72/542* (2023.01); *H04B 7/0413* (2013.01); *H04B 17/318* (2015.01); *H04L 43/16* (2013.01); *H04W 8/24* (2013.01); *H04W 24/08* (2013.01); *H04W 72/51* (2023.01); *H04W 88/06* (2013.01)

(58) Field of Classification Search
CPC . H04W 24/08; H04W 72/048; H04W 72/085; H04W 88/06; H04W 8/24; H04W 72/51; H04W 72/542; H04B 7/0404; H04B 7/0408; H04B 7/0413; H04B 17/318; H04B 7/0452; H04L 43/00; H04L 43/02; H04L 43/06; H04L 43/08; H04L 43/16
See application file for complete search history.

(56) References Cited

U.S. PATENT DOCUMENTS

| 10,051,511 | B1* | 8/2018 | Mehta | H04W 28/0284 |
| 10,412,691 | B1 | 9/2019 | Marupaduga et al. | |
| 2014/0023154 | A1* | 1/2014 | Rajagopal | H04B 7/0456 375/260 |
| 2014/0241192 | A1* | 8/2014 | Kim | H04L 1/1671 370/252 |
| 2014/0301306 | A1* | 10/2014 | Kim | H04L 5/0046 370/329 |
| 2018/0352587 | A1* | 12/2018 | Pollack | H04L 67/145 |
| 2021/0152278 | A1* | 5/2021 | Abdel Shahid | H04L 1/0003 |
| 2021/0378039 | A1* | 12/2021 | Cherian | H04W 76/34 |
| 2022/0022223 | A1* | 1/2022 | Yang | H04L 5/0048 |

* cited by examiner

*Primary Examiner* — Benjamin H Elliott, IV
*Assistant Examiner* — Prince A Mensah
(74) *Attorney, Agent, or Firm* — Jones Robb, PLLC

(57) ABSTRACT

Dynamically limiting MIMO transmission layers assigned to wireless devices to mitigate uplink noise levels measured at an access node (e.g. RSSI). The transmission layers can be adjusted based on a device capability or power class. For example, maximum MIMO transmission layers assigned to HPUEs can be reduced first.

17 Claims, 8 Drawing Sheets

LIMITING UPLINK NOISE BY ADJUSTING MIMO TRANSMISSION LAYERS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mmWave) networks, as well as older legacy networks. In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is colocated with a 5G gNodeB at the same cell site or radio access network), or distributed or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed low power wireless devices. As shown in Table 1 below, the maximum allowable transmit power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmit power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other low-power wireless devices are currently defined in LTE as power class 3 and/or power class 4 wireless devices. Power class 3 and/or power class 4 low-power wireless devices can be configured with a maximum allowable transmit power level of +23 dBm for frequency bands I-III with a nominal power tolerance of ±2 dB (e.g., for E-UTRA bands). High-power class wireless devices are currently defined as power class 1 or power class 2 wireless devices. Power class 1 and/or power class 2 high-power class wireless devices can be configured with a maximum allowable transmit power level of +26 dBm for frequency bands I-II with a nominal power tolerance ±2 dB (e.g., for E-UTRA bands), as illustrated in Table 1.

Because high-power class wireless devices are capable of transmitting at a maximum allowable transmit power that is higher than lower-power class wireless devices, there are potential uplink interference concerns when too many wireless devices are utilizing maximum allowable transmit power when it is not needed. Further, with the evolution of 5G, mmWave, and sub-6G, increasing numbers of antennae can be used to form beams or perform multiple-in multiple-out (MIMO) operating modes, including single-user (SU-MIMO) and/or a multi-user (MU-MIMO) mode. In a recent evolution of MIMO technology, known as massive MIMO or large-scale MIMO, an access node may utilize hundreds of antennae to simultaneously transmit each of a plurality of different data streams to a corresponding plurality of wireless devices. Since MIMO utilizes orthogonal transmission layers to transmit multiple streams to wireless devices, massive MIMO is able to leverage the hundreds of antennae to transmit many streams across many orthogonal layers. As wireless device technology improves, increasing numbers of wireless devices are using higher transmit powers to transmit uplink data. For example, uplink MU-MIMO is a new service that applies MIMO technology to transmitting uplink data using a plurality of layers or streams.

Therefore, there can be issues related to uplink interference caused at the multiple antennae of a serving access node, such as a base station, eNodeB, or gNodeB. For example, when increasing numbers of wireless devices are transmitting large amounts of data using uplink MIMO, there is more noise caused in the uplink channel. The noise may be caused by interference due to the different streams arriving at the antennae, and is particularly exacerbated when the uplink channel is loaded (which can be caused by too many wireless devices participating in uplink MU-MIMO), or when the wireless devices comprise high powered wireless devices. This can cause increased uplink interference, or "noise rise" that can further cause issues such as packet losses and increased retransmissions, potentially minimizing any gains expected by the increased spectral efficiency provided by MU-MIMO in the first place.

Overview

Exemplary embodiments described herein include methods, systems, and processing nodes for limiting uplink noise by adjusting MIMO transmission layers. An exemplary method for limiting uplink noise includes monitoring an uplink signal level at an access node, and responsive to the uplink signal level meeting a first threshold uplink signal level, reducing a quantity of transmission layers assigned to wireless devices attached to the access node.

Another exemplary method for adjusting a quantity of transmission layers assigned to wireless devices in a wireless network includes obtaining a signal condition of uplink signals received at an access node from one or more wireless devices attached to the access node, and responsive to changes in the signal condition, adjusting the quantity of transmission layers assigned to the wireless devices.

Another exemplary method for reducing uplink noise by limiting MIMO transmission layers determining that an uplink signal level received at an access node rises to meet a threshold, and reducing a quantity of transmission layers assigned to wireless devices attached to the access node.

These exemplary operations described herein may be performed by a processing node within a system, such as a telecommunication system. For example, an exemplary system for limiting uplink noise in heterogeneous networks includes at least a processing node and a processor coupled to the processing node. The processing node can be configured to perform operations including any of the operations described herein in any combination.

For example, an exemplary processing node can be configured to perform operations including monitoring an uplink signal level at an access node, and responsive to the uplink signal level meeting a first threshold uplink signal level, reducing a quantity of transmission layers assigned to wireless devices attached to the access node.

Another exemplary processing node can be configured to perform operations including adjusting a quantity of transmission layers assigned to wireless devices in a wireless network includes obtaining a signal condition of uplink signals received at an access node from one or more wireless devices attached to the access node, and responsive to changes in the signal condition, adjusting the quantity of transmission layers assigned to the wireless devices.

Another exemplary processing node can be configured to perform operations including determining that an uplink signal level received at an access node rises to meet a threshold, and reducing a quantity of transmission layers assigned to wireless devices attached to the access node.

DETAILED DESCRIPTION

Figure 1:
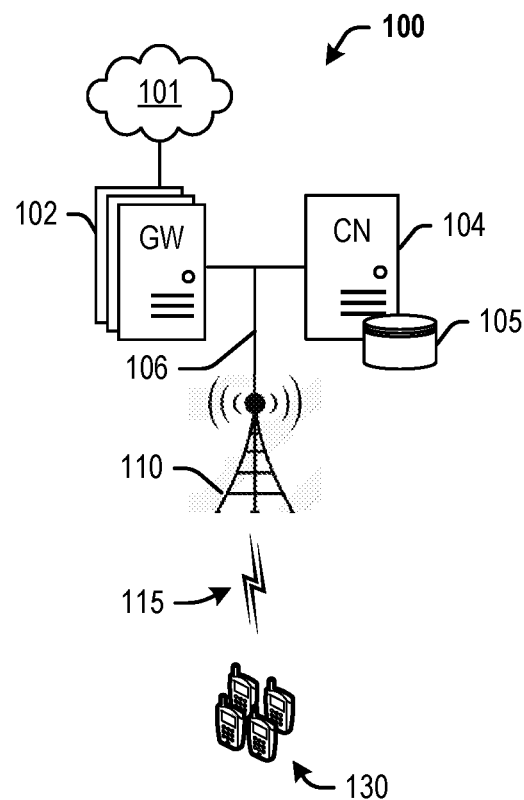
FIG. 1 depicts an exemplary system for limiting uplink noise by adjusting MIMO transmission layers.

The following disclosure provides methods and systems for dynamically limiting MIMO transmission layers assigned to wireless devices to mitigate uplink noise levels caused by excessive uplink transmissions received at access nodes. Based on uplink signal levels measured at an access node (e.g. received signal strength indicator or RSSI), transmission layers for wireless devices can be adjusted. The transmission layers can be adjusted based on a device capability or power class. For example, maximum MIMO transmission layers assigned to high power wireless devices can be reduced first, and if uplink signal levels remain high, then the maximum MIMO transmission layers assigned to low power wireless devices can be reduced. Reducing the quantity of transmission layers assigned to wireless devices in dense networks thereby reduces the potential for uplink interference and/or noise levels.

Exemplary heterogeneous dual-connectivity wireless networks described herein include access nodes that are capable of communicating using a plurality of wireless air interfaces or RATs. For example, an access node can include a combination of a 4G eNodeB and a 5G gNodeB. In other words, the access node can be configured to communicate using 4G LTE as well using 5G NR. In some embodiments, the access node can include a 4G eNodeB coupled to a plurality of 5G gNodeBs (one-to-many or distributed configuration). In similar embodiments, the access nodes can be selected from either the eNodeB or one of the 5G gNodeBs. As further described herein, the access nodes can be part of the same or different cell sites or radio access networks (RANs), each RAN being served by a different cell site router. Thus, the communication channel for which the transmit power is adjusted can utilize two or more RATs, such that the density of access nodes that deploy at least one of the two or more RATs is determined, and the transmit power for wireless devices utilizing said at least one of the two or more RATs is adjusted. Different RAN configurations for EN-DC capable access nodes are described, with each RAN configuration enabling participation in dual-connectivity using at least two RATs. For example, each access node can include a primary access node configured to deploy carriers utilizing the a first RAT, and the primary access node is coupled to one or more secondary access nodes, each secondary access node configured to deploy carriers utilizing a second RAT. Alternatively, each access node comprises a secondary access node configured to deploy carriers utilizing the second RAT, the secondary access node being coupled to a primary access node configured to deploy carriers utilizing the first RAT.

Therefore, a method as described herein for adjusting a quantity of transmission layers assigned to wireless devices in a wireless network includes obtaining a signal condition of uplink signals received at an access node from one or more wireless devices attached to the access node, and responsive to changes in the signal condition, adjusting the quantity of transmission layers assigned to the wireless devices. The signal condition can include a strength indicator or uplink signal level, such as a receive signal strength indicator (RSSI) that is measured at one or more antennae of the access node to which the wireless devices are attached. The method can include reducing the quantity of transmission layers for high powered wireless devices from among the wireless devices attached to the access node. This can be enabled by first obtaining a device capability of wireless devices attached to the access node via, for example, an initial connection or attach request.

Different threshold levels can be used to determine whether or not to reduce transmission layers for high power wireless devices versus standard or low power wireless devices. For example, the method can further include reducing the quantity of transmission layers for the high powered wireless devices upon the uplink signal level meeting a first threshold uplink signal level and staying below a second threshold uplink signal level. In an exemplary embodiment, the first threshold uplink signal level is −85 dB and the second threshold uplink signal level is −80 dB. When the uplink signal level meets the second threshold uplink signal level (i.e. −80 dB), then the quantity of transmission layers for standard or low powered wireless devices can be reduced. Thus, the quantity of transmission layers is reduced for additional wireless devices upon the uplink signal level rising past additional thresholds.

The method can further include reducing the quantity of transmission layers for standard or low powered wireless devices upon determining that there are no high powered wireless devices for which the quantity of transmission layers can be reduced. The method can further include reducing the quantity of transmission layers for high powered wireless devices from among the wireless devices attached to the access node upon the quantity of wireless devices attached to the access node meeting a threshold quantity. Conversely, if the quantity of wireless devices attached to the access node does not meet the threshold quantity, then the reduction in transmission layers can be performed for any wireless device attached to the access node regardless of device capability or power class.

The method can further include reducing the quantity of transmission layers by one half. In an exemplary embodiment, the quantity of transmission layers is reduced from 4 to 2. In another exemplary embodiment, the quantity of transmission layers is reduced from 2 to 1. Different levels of reduction may be performed for different power class wireless devices. Further, the method can include monitoring the uplink signal level for a first carrier deployed by the access node, and reducing the quantity of transmission layers assigned to wireless devices attached to the first carrier. Therefore, in the EN-DC systems described herein, the uplink signal level is monitored for a primary carrier (e.g. a 4G carrier) or a secondary carrier (e.g. a 5G carrier), and quantity of transmission layers adjusted for wireless devices utilizing the specific carrier.

These and other embodiments are further described herein and with reference to FIGS. 1-9.

FIG. 1 depicts an exemplary system 100 comprising a communication network 101, gateway 102, controller node 104, access node 110, and wireless devices 130. In this exemplary embodiment, access node 110 may be a macro-cell access node configured to deploy wireless air interfaces 115 to which wireless devices 130 can attach and access network services from network 101. Further, access node 110 may be configured to deploy at least two wireless air interfaces using dual connectivity. For example, access node 110 can include a combination of an eNodeB and a gNodeB, such that access node 110 is configured to deploy a wireless air interface using a first RAT (e.g. 4G LTE) and a second RAT (e.g. 5G NR). Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Further, access node 110 can be configured to communicate using both RATs at the same time. For example, dual connections can be set up with wireless devices 130 using both 4G and 5G wireless air interfaces, with the 4G wireless air interface being used to transmit control information, and the 5G wireless air interface being used to transmit data information. Although only access node 110 and wireless devices 130 are illustrated in FIG. 1, system 100 can include various other combinations of carriers/wireless air interfaces, antenna elements, access nodes, and wireless devices, as may be evident to those having ordinary skill in the art in light of this disclosure.

In an exemplary embodiment, the processing node is further is configured to perform operations for adjusting a quantity of transmission layers assigned to wireless devices 130 based on signal conditions of uplink signals received at access node 110. The signal condition can include a strength indicator of uplink signals on wireless air interfaces 115, such as a receive signal strength indicator (RSSI) that is measured at one or more antennae of the access node 110. The method can include reducing the quantity of transmission layers for high powered wireless devices from among the wireless devices 130. Different threshold levels can be used to determine whether or not to reduce transmission layers for high power wireless devices versus standard or low power wireless devices from among the wireless devices 130. For example, the method can further include reducing the quantity of transmission layers for the high powered wireless devices upon the uplink signal level meeting a first threshold uplink signal level and staying below a second threshold uplink signal level. In an exemplary embodiment, the first threshold uplink signal level is −85 dB and the second threshold uplink signal level is −80 dB. When the uplink signal level meets the second threshold uplink signal level (i.e. −80 dB), then the quantity of transmission layers for standard or low powered wireless devices can be reduced. The method can further include reducing the quantity of transmission layers for standard or low powered wireless devices upon determining that there are no high powered wireless devices among wireless devices 130. The method can further include reducing the quantity of transmission layers for high powered wireless devices from among the wireless devices 130 upon the quantity of wireless devices 130 meeting a threshold quantity. Different levels of reduction may be performed for different power class wireless devices. In an exemplary embodiment, the quantity of transmission layers is reduced from 4 to 2. In another exemplary embodiment, the quantity of transmission layers is reduced from 2 to 1. Further, the method can include monitoring the uplink signal level for a first carrier deployed by the access node 110, and reducing the quantity of transmission layers assigned to wireless devices 130 attached to the first carrier.

Further, an exemplary method performed by system 100 can include obtaining a signal condition of uplink signals received at access node 110 from one or more wireless devices 130 attached to the access node 110, and responsive to changes in the signal condition, adjusting the quantity of MIMO transmission layers assigned to the wireless devices 130. The signal condition can include a receive signal strength indicator (RSSI). The operations can further include determining that the signal condition rises to meet one or more signal condition thresholds, and reducing the quantity of transmission layers in one or more increments. The operations can further include determining that the signal condition falls to meet the one or more signal condition thresholds, and increasing the quantity of transmission layers in the one or more increments. Adjusting the quantity of transmission layers can be selectively performed for high powered wireless devices among wireless devices 130, based on the signal condition staying between a first set of thresholds. Adjusting the quantity of transmission layers can further be selectively performed for standard and low powered wireless devices based on the signal condition exceeding the first set of thresholds.

Access node 110 can be any network node configured to provide communication between wireless devices 130 and communication network 101, including standard access nodes such as a macro-cell access node, base transceiver station, a radio base station, an eNodeB device, an enhanced eNodeB device, an a next generation NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access node such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access node 110 and processing nodes coupled thereto are further described with reference to FIGS. 2-3.

Wireless devices 130 may be any device, system, combination of devices, or other such communication platform capable of communicating wirelessly with access node 110 using one or more frequency bands deployed therefrom. Wireless devices 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication link 106 can be direct links or might include various equipment, intermediate components, systems, and networks, such as a cell site router, etc. Communication link 106 may comprise many different signals sharing the same link. Communication link 106 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as power class/capabilities of wireless devices 130, historic uplink signal levels measured at access node 110, and so on. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, gateway(s) 102, controller node 104, and/or network 101.

Figure 2:
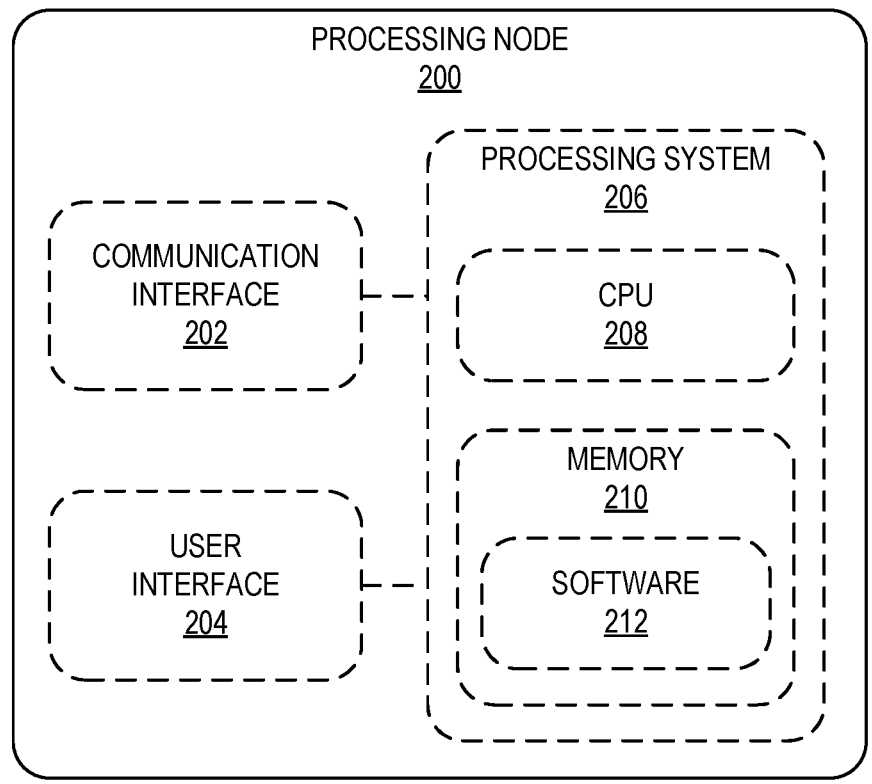
FIG. 2 depicts an exemplary processing node for limiting uplink noise by adjusting MIMO transmission layers.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for limiting uplink noise by monitoring an uplink signal level at an access node, and responsive to the uplink signal level meeting a first threshold uplink signal level, reducing a quantity of transmission layers assigned to wireless devices attached to the access node. In another exemplary embodiment, software 212 can include instructions for adjusting a quantity of transmission layers assigned to wireless devices in a wireless network by obtaining a signal condition of uplink signals received at an access node from one or more wireless devices attached to the access node, and responsive to changes in the signal condition, adjusting the quantity of transmission layers assigned to the wireless devices. In another exemplary embodiment, software 212 can include instructions for reducing uplink noise by determining that an uplink signal level received at an access node rises to meet a threshold, and reducing a quantity of transmission layers assigned to wireless devices attached to the access node.

Figure 3:
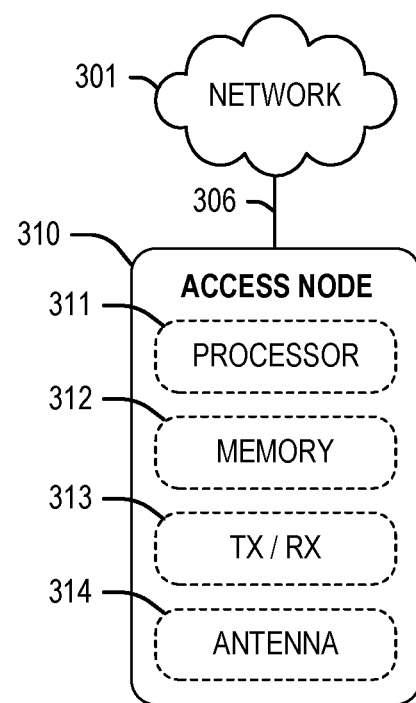
FIG. 3 depicts an exemplary access node for limiting uplink noise by adjusting MIMO transmission layers.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, a transceiver 313, and antennae 314 (hereinafter referred to as antenna elements 314). Processor 311 executes instructions stored on memory 312, and transceiver 313 (in conjunction with antenna elements 314) enable wireless communication respectively at least two wireless air interfaces, such as 4G LTE and 5G NR. For example, access node 310 may be configured to transmit control information using a first set of antennae elements 314 configured to utilize a 4G LTE interface, and data information using a second set of antennae elements 314 configured to utilize a 5G NR air interface. Alternatively or in addition, each separate air interface maintains its own control and data transmissions. Further, antenna elements 314 may include an array of antenna elements that are configured to deploy air interfaces over one or more wireless sectors, form beams within these sectors, employ multiple-input-multiple-output (MIMO), etc.

In an exemplary embodiment, memory 312 can store instructions for limiting uplink noise by monitoring an uplink signal level at an access node, and responsive to the uplink signal level meeting a first threshold uplink signal level, reducing a quantity of transmission layers assigned to wireless devices attached to the access node. In another exemplary embodiment, memory 312 can include instructions for adjusting a quantity of transmission layers assigned to wireless devices in a wireless network by obtaining a signal condition of uplink signals received at an access node from one or more wireless devices attached to the access node, and responsive to changes in the signal condition, adjusting the quantity of transmission layers assigned to the wireless devices. In another exemplary embodiment, memory 312 can include instructions for reducing uplink noise by determining that an uplink signal level received at an access node rises to meet a threshold, and reducing a quantity of transmission layers assigned to wireless devices attached to the access node.

Figure 4:
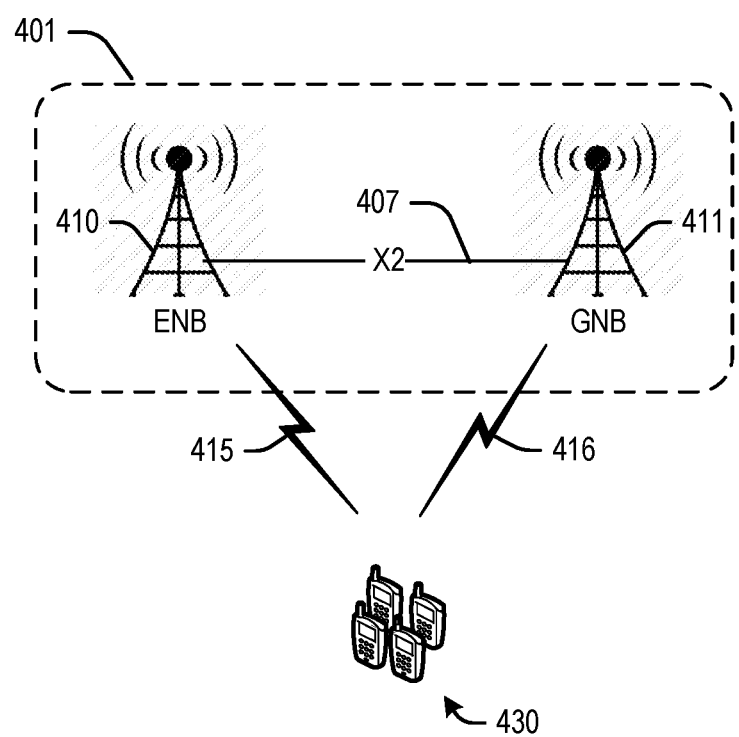
FIG. 4 depicts an exemplary collocated access node in a dual-connectivity network.

FIG. 4 depicts an exemplary collocated 5G EN-DC radio access network (RAN) 401. RAN 401 includes colocated access nodes 410, 411, and may include other components not shown herein for convenience, such as cell site routers, controllers, etc. Further, RAN 401 may be connected to other intermediate or core networks. In this exemplary embodiment, access node 410 can include an eNodeB, and access node 411 can include a gNodeB. For example, access node 410 can be configured to deploy a wireless interface 415 using a first radio access technology (RAT), e.g. 4G LTE, and access node 411 can be configured to deploy a second wireless interface 416 using a second RAT, e.g. 5G NR. Each RAT can be configured to utilize a different frequency band or sub-band, a different channel size or bandwidth, and so on. For example, the 5G NR wireless interface 416 can be configured to utilize higher frequencies and larger channel bandwidths than the 4G LTE wireless air interface 415.

Further, access nodes 410, 411 can be configured to communicate using both RATs at the same time. For example, dual connections can be set up with any of wireless devices 430 using both 4G and 5G wireless air interfaces 415, 416, the 4G wireless air interface 415 being used to transmit control information, and the 5G wireless air interface 416 being used to transmit data information. For example, a processing node within RAN 401 (for example, communicatively coupled to access nodes 410, 411, or any other network node) can be configured to determine whether or not wireless devices 430 are capable of communicating using both RATs (e.g. capable of 5G EN-DC), and instruct the access node 410 to broadcast an indicator in, for example, a system information message. Responsive to the indicator, wireless devices 430 can attach to access node 410 which can use the 4G carrier to control and set up a dual connectivity session with the wireless devices 430. In other words, control information (including SIB messages) is transmitted from the access node 410 using the 4G LTE wireless air interface, while the 5G NR wireless air interface is utilized for transmission of data via access node 411. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. Further, within radio access network 402, access nodes 410 and 411 can be coupled via a direct communication link 407, which can include an X2 communication link. Access nodes 410 and 411 can communicate control and data information across X2 communication link 407. In an exemplary embodiment, access node 411 includes logic to determine how to allocate data packets between access node 410 and access node 411, wherein the data packets flow between wireless devices 430 and any external network node. Such logic may include a packet data convergence protocol (PDCP) function. Thus, RAN 401 can include a plurality of antenna elements (not shown herein) coupled to access nodes 410 and 411, with different antenna elements configured to deploy a different radio air interface using a different frequency.

Further, the processing node within RAN 401 can be configured to perform methods for adjusting a quantity of transmission layers assigned to wireless devices 430 based on signal conditions of uplink signals received at access nodes 410, 411. The signal condition can include a strength indicator of uplink signals on wireless air interfaces 415, 416, such as a receive signal strength indicator (RSSI) that is measured at one or more antennae of the access nodes 410, 411. The method can include reducing the quantity of transmission layers for high powered wireless devices from among the wireless devices 430. Different threshold levels can be used to determine whether or not to reduce transmission layers for high power wireless devices versus standard or low power wireless devices from among the wireless devices 430. For example, the method can further include reducing the quantity of transmission layers for the high powered wireless devices upon the uplink signal level meeting a first threshold uplink signal level and staying below a second threshold uplink signal level. In an exemplary embodiment, the first threshold uplink signal level is −85 dB and the second threshold uplink signal level is −80 dB. When the uplink signal level meets the second threshold uplink signal level (i.e. −80 dB), then the quantity of transmission layers for standard or low powered wireless devices can be reduced.

The method can further include reducing the quantity of transmission layers for standard or low powered wireless devices upon determining that there are no high powered wireless devices among wireless devices 430. The method can further include reducing the quantity of transmission layers for high powered wireless devices from among the wireless devices 430 upon the quantity of wireless devices 430 meeting a threshold quantity. Different levels of reduction may be performed for different power class wireless devices. In an exemplary embodiment, the quantity of transmission layers is reduced from 4 to 2. In another exemplary embodiment, the quantity of transmission layers is reduced from 2 to 1. Further, the method can include monitoring the uplink signal level for a wireless air interface (i.e. 4G carrier) 415 deployed by the access node 410, and reducing the quantity of transmission layers assigned to wireless devices 430 that are attached to the first carrier. Alternatively or in addition, the method can include monitoring the uplink signal level for a second wireless air interface (i.e. 5G carrier) 416 deployed by the access node 411, and reducing the quantity of transmission layers assigned to wireless devices 430 that are attached to the second carrier.

Figure 5:
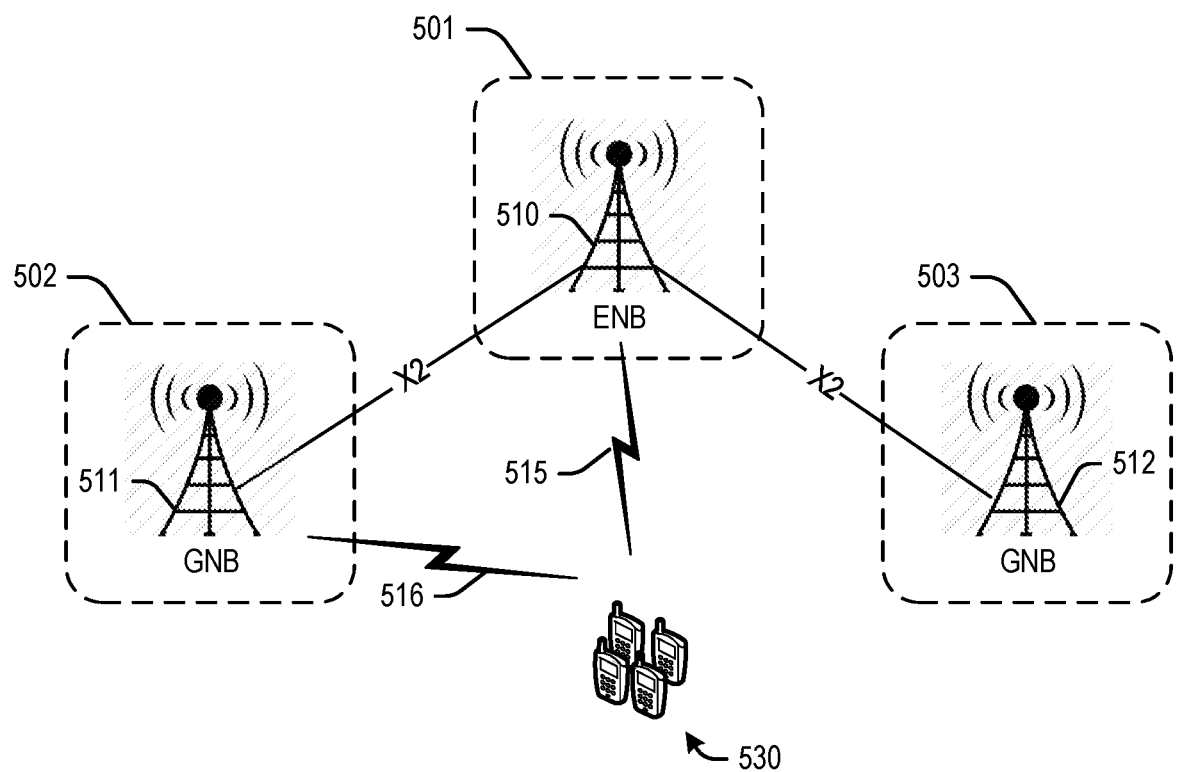
FIG. 5 depicts exemplary distributed access nodes in a dual-connectivity network.

FIG. 5 depicts an exemplary distributed 5G EN-DC system. Each of RANs 501, 502, 503 includes at least access nodes 510, 511, 512 respectively. This embodiment depicts a one-to-many configuration, in which an eNodeB access node 510 is designated as a primary access node for wireless devices 530, and one or more gNodeB access nodes 511, 512 are selected as secondary access nodes, as further described below. Persons having ordinary skill in the art may note that other components may be included in any combination, without materially affecting the scope and spirit of the described embodiments.

In this exemplary embodiment, access node 510 can include an eNodeB, and access nodes 511, 512 can include gNodeBs. For example, access node 510 can be configured to deploy a wireless interface 515 using a first radio access technology (RAT), e.g. 4G LTE, and access nodes 511, 512 can be configured to deploy wireless interfaces using a second RAT, e.g. 5G NR. Further, access nodes 510, 511, 512 can be configured to communicate using both RATs at the same time. For example, dual connections can be set up with wireless devices 530 using both 4G and 5G air interfaces respectively, the 4G wireless interface 515 being used to transmit control information, and one of the 5G wireless interfaces (e.g. 5G interface 516) being used to transmit data information. For example, a processing node communicatively coupled to access node 510 can be configured to determine whether or not wireless devices 530 are capable of communicating using both RATs (e.g. capable of 5G EN-DC), and instruct the access node 510 to broadcast an indicator in, for example, a system information message. Responsive to the indicator, wireless devices 530 can attach to access node 510 which can use the 4G carrier to control and set up a dual connectivity session with wireless devices 530. Further, access node 510 can be configured to select one (or more) of access nodes 511, 512 as a secondary access node, to transport user data. In other words, control information (including SIB messages) is transmitted from the access node 510 using the 4G LTE air interface, while the 5G NR air interfaces (e.g. 5G NR air interface 516) is utilized for transmission of data. Further, access nodes 511 and 512 (hereinafter "secondary access nodes") can each be coupled to access node 510 (hereinafter "primary access node") via X2 communication links. In an exemplary embodiment, each secondary access node 511, 512 can include logic to determine how to allocate data packets between the access nodes, wherein the data packets flow between wireless devices 530 and a network node not shown herein. Such logic may include a packet data convergence protocol (PDCP) function.

Further, a processing node communicatively coupled to any of access nodes 510, 511, 512 can be configured to perform methods for adjusting a quantity of transmission layers assigned to wireless devices 530 based on signal conditions of uplink signals received at access nodes 510, 511. The signal condition can include a strength indicator of uplink signals on wireless air interfaces 515, 516, such as a receive signal strength indicator (RSSI) that is measured at one or more antennae of the access nodes 510, 511. The method can include reducing the quantity of transmission layers for high powered wireless devices from among the wireless devices 530. Different threshold levels can be used to determine whether or not to reduce transmission layers for high power wireless devices versus standard or low power wireless devices from among the wireless devices 530. For example, the method can further include reducing the quantity of transmission layers for the high powered wireless devices upon the uplink signal level meeting a first threshold uplink signal level and staying below a second threshold uplink signal level. In an exemplary embodiment, the first threshold uplink signal level is −85 dB and the second threshold uplink signal level is −80 dB. When the uplink signal level meets the second threshold uplink signal level (i.e. −80 dB), then the quantity of transmission layers for standard or low powered wireless devices can be reduced.

The method can further include reducing the quantity of transmission layers for standard or low powered wireless devices upon determining that there are no high powered wireless devices among wireless devices 530. The method can further include reducing the quantity of transmission layers for high powered wireless devices from among the wireless devices 530 upon the quantity of wireless devices 530 meeting a threshold quantity. Different levels of reduction may be performed for different power class wireless devices. In an exemplary embodiment, the quantity of transmission layers is reduced from 4 to 2. In another exemplary embodiment, the quantity of transmission layers is reduced from 2 to 1. Further, the method can include monitoring the uplink signal level for a first wireless air interface 515 deployed by the access node 510, and reducing the quantity of transmission layers assigned to wireless devices 530 that are attached to the first carrier. Alternatively or in addition, the method can include monitoring the uplink signal level for a second carrier 516 deployed by the access node 511, and reducing the quantity of transmission layers assigned to wireless devices 530 that are attached to the second carrier.

Figure 6:
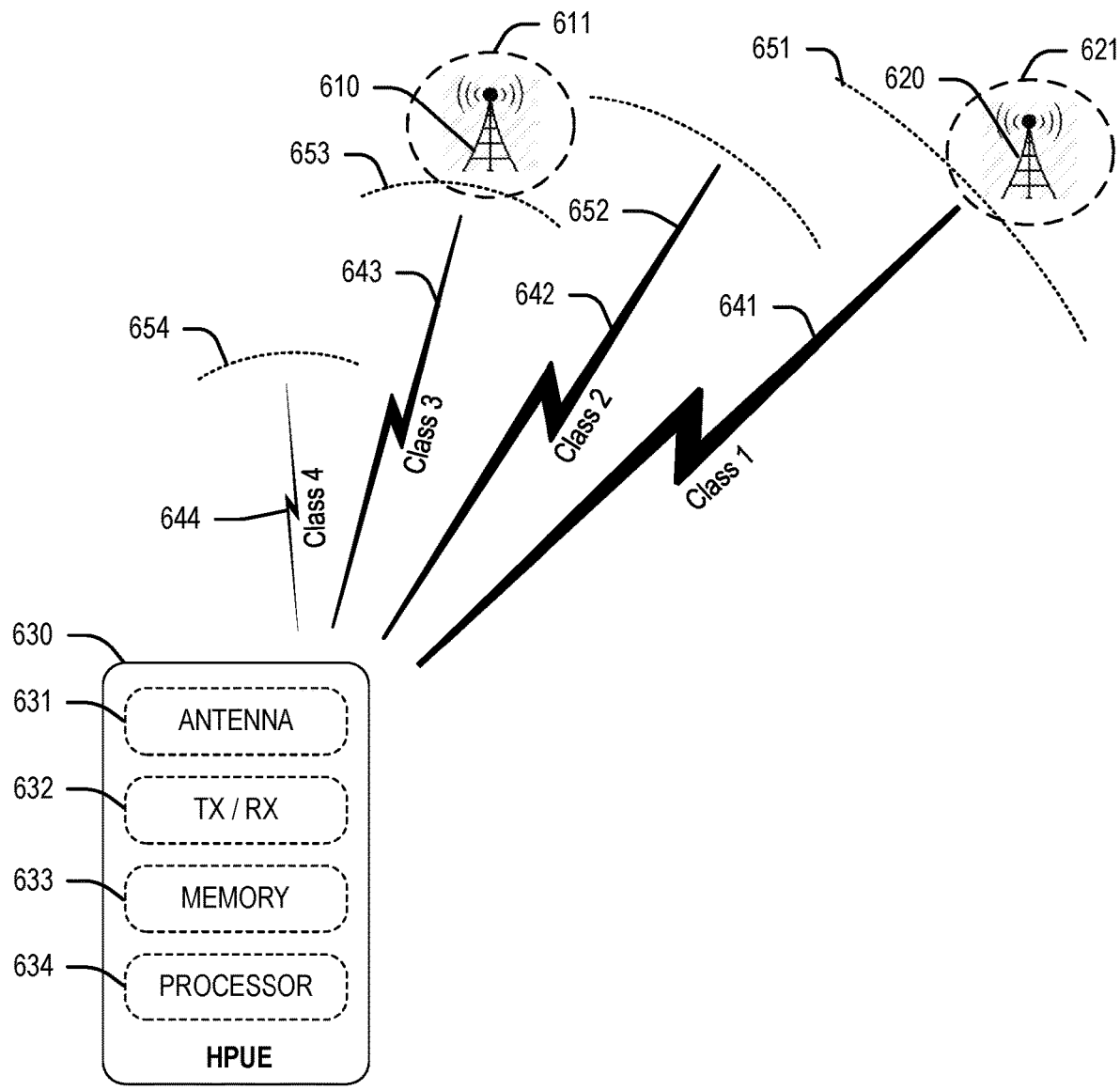
FIG. 6 depicts an exemplary high powered wireless device.

FIG. 6 depicts an exemplary wireless device 630 capable of transmission in several power classes. As noted above, wireless devices can be configured as different power class wireless devices (e.g., high-power wireless devices and/or standard-power wireless devices as well as low-power wireless devices). Wireless device 630 is therefore equipped with an appropriate antenna 631 and transceiver 632 enabling increased transmit power from wireless device 630 to one or more access node 610, 620. For example, wireless device 630 is capable of operating in a transmission mode utilizing power class 1, to transmit an uplink transmission 641 at a range 651. Wireless device 630 may further switch transmission modes to utilizing power class 2 to transmit uplink transmission 642 at a range 652, utilizing power class 3 to transmit uplink transmission 643 at a range 653, and utilizing power class 4 to transmit uplink transmission 644 at a range 654. Antenna 631 and transceiver 632 are appropriately configured to utilize these differently-powered transmission modes.

Figure 7:
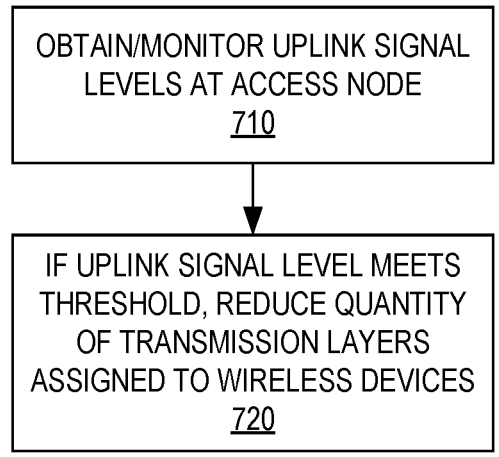
FIG. 7 depicts an exemplary method for limiting uplink noise by adjusting MIMO transmission layers.

FIG. 7 depicts an exemplary method for limiting uplink noise by adjusting MIMO transmission layers. The method of FIG. 7 may be implemented by a processing node communicatively coupled to one or more access nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, uplink signal levels are obtained and/or monitored at an access node serving one or more wireless devices. If the uplink signal level meets a threshold, at 720, a quantity of transmission layers assigned to the one or more wireless devices is reduced. Further, the transmission layers can be adjusted based on a device capability or power class. For example, maximum MIMO transmission layers assigned to high power wireless devices can be reduced first, and if uplink signal levels remain high, then the maximum MIMO transmission layers assigned to low power wireless devices can be reduced. Reducing the transmission layers of wireless devices in dense networks thereby reduces the potential for uplink interference and/or noise levels. Further, the access node can be capable of communicating using a plurality of RATs, e.g. a combination of a 4G eNodeB and a 5G gNodeB. Therefore, the uplink signal level may be associated with one of these RATs, and the quantity of transmissions layers adjusted for wireless devices attached to said one of the RATs.

Figure 8:
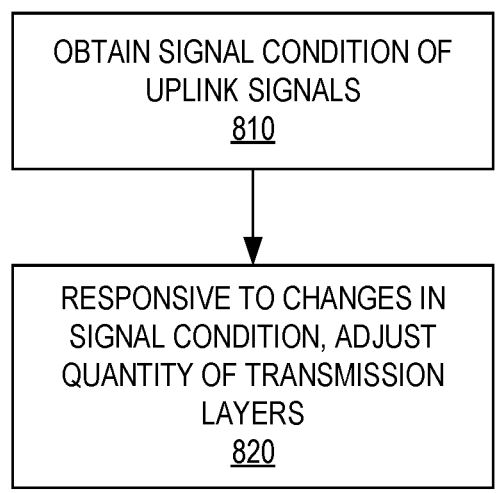
FIG. 8 depicts another exemplary method for limiting uplink noise by adjusting MIMO transmission layers.

FIG. 8 depicts an exemplary method for limiting uplink noise by adjusting MIMO transmission layers. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, a signal condition of uplink signals is obtained at an access node serving one or more wireless devices. The signal condition can comprise a receive signal strength indicator (RSSI). Responsive to changes in the signal condition, at 820, a quantity of transmission layers assigned to the one or more wireless devices is adjusted. For example, if the RSSI increases past one or more thresholds, then the quantity of transmission layers is reduced and, if the RSSI decreases past one or more thresholds, the quantity of transmission layers can be increased. Further, the transmission layers can be adjusted based on a device capability or power class. For example, maximum MIMO transmission layers assigned to high power wireless devices can be reduced first, and if uplink signal levels remain high, then the maximum MIMO transmission layers assigned to low power wireless devices can be reduced. Further, the uplink signal level may be associated with one or more RATs, and the quantity of transmissions layers adjusted for wireless devices attached to said one or more RATs.

Figure 9:
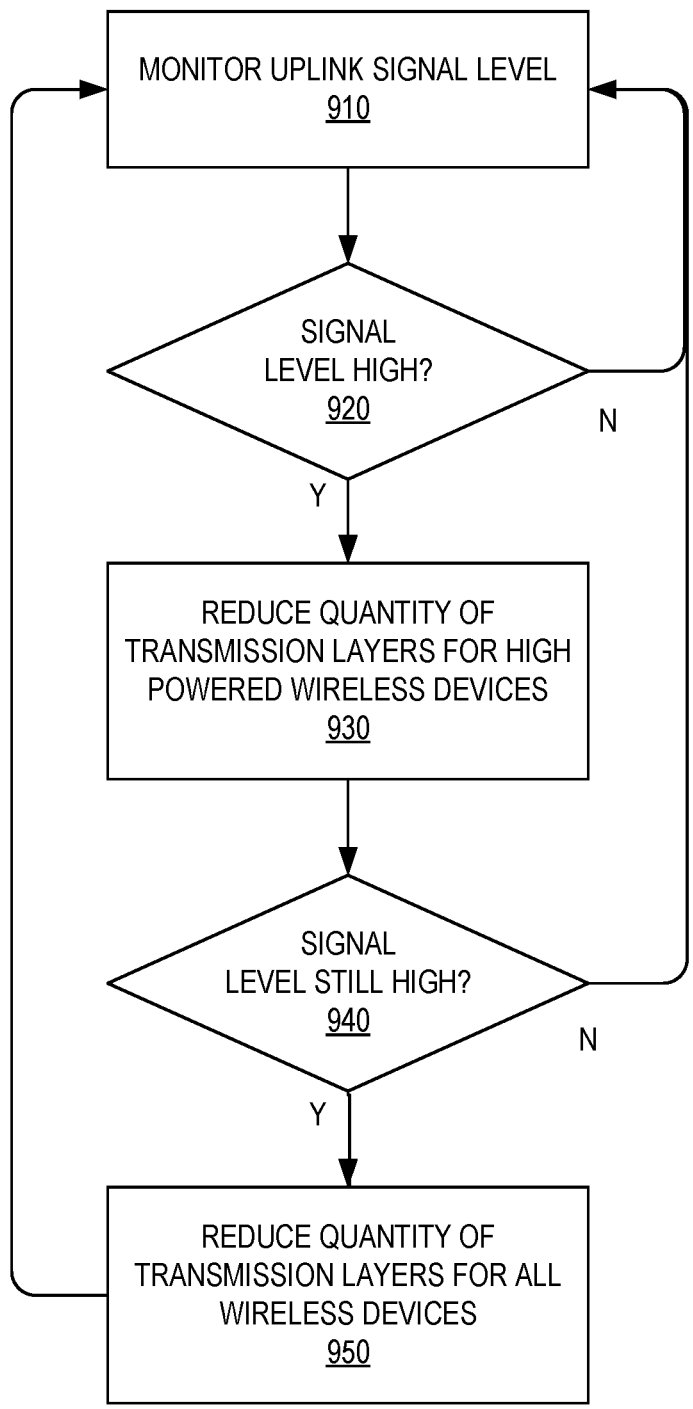
FIG. 9 depicts another exemplary method for limiting uplink noise by adjusting MIMO transmission layers.

FIG. 9 depicts an exemplary method for limiting uplink noise by adjusting MIMO transmission layers. The method of FIG. 9 may be implemented by a processing node communicatively coupled to one or more access nodes, controller nodes, or any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, an uplink signal level is monitored. The uplink signal level may include an RSSI monitored at an access node serving one or more wireless devices. The access node can include one or more dual connectivity access nodes in any of the configurations described above. At 920, if the uplink signal level is high (i.e. exceeds a threshold), then a quantity of transmission layers is reduced for high powered wireless devices at 930. Reducing the quantity of transmission layers assigned to high powered wireless devices thereby reduces the potential for uplink interference and/or noise levels, while maintaining a service quality for standard or low powered wireless devices. The quantity of transmission layers can be reduced in increments depending on the threshold exceeded by the signal level(s). For example, if the signal condition rises to meet one or more different signal condition thresholds at 920, the quantity of transmission layers can be reduced in one or more increments at 930.

Further, it may be determined at 940 that the uplink signal levels are still high, i.e. past the threshold, or past another threshold as described above. Thus, at 950, a quantity of transmission layers is reduced for any wireless devices (including high power and standard or lower powered wireless devices). The quantity of transmission layers can be reduced in increments depending on the threshold exceeded by the signal level(s). Reducing the quantity of transmission layers assigned to all wireless devices thereby reduces the potential for uplink interference and/or noise levels, while maintaining a service quality for all wireless devices.

While 4G LTE and 5G NR are described in the above embodiments, the disclosed operations may apply to different combinations of radio air interfaces, including any combination of radio air interfaces within the same or different radio-access technologies, such as multiple different 4G carriers with different bandwidths, 5G carriers with different bandwidths, or any future wireless technology. So long as the described adjustment of maximum allowable transmit power based on density of access nodes is performed as described herein, the specific implementation and network topology is less relevant.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for limiting uplink noise in heterogeneous wireless networks, the method comprising,
    monitoring an uplink signal level at an access node; and
    responsive to the uplink signal level meeting a first threshold uplink signal level, reducing a quantity of transmission layers assigned to high powered wireless devices from among the wireless devices attached to the access node.

2. The method of claim 1, further comprising reducing the quantity of transmission layers for high powered wireless devices from among the wireless devices attached to the access node upon the uplink signal level meeting the first threshold uplink signal level and staying below a second threshold uplink signal level.

3. The method of claim 2, further comprising reducing the quantity of transmission layers for standard or low powered wireless devices upon the uplink signal level exceeding the second threshold uplink signal level.

4. The method of claim 1, further comprising reducing the quantity of transmission layers for standard or low powered wireless devices upon determining that there are no high powered wireless devices for which the quantity of transmission layers can be reduced.

5. The method of claim 1, further comprising reducing the quantity of transmission layers for high powered wireless devices from among the wireless devices attached to the access node upon a quantity of wireless devices attached to the access node meeting a threshold quantity.

6. The method of claim 1, further comprising reducing the quantity of transmission layers by one half.

7. The method of claim 1, further comprising:
    monitoring the uplink signal level for a first carrier deployed by the access node; and
    reducing the quantity of transmission layers assigned to wireless devices attached to the first carrier.

8. The method of claim 7, wherein the first carrier is one of a primary carrier or a secondary carrier deployed by the access node using dual-connectivity.

9. A system for adjusting a quantity of transmission layers assigned to wireless devices in a wireless network, the system comprising,
    a processing node; and a processor coupled to the processing node, the processor being configured to perform operations comprising:
   obtaining a signal condition of uplink signals received at an access node from one or more wireless devices attached to the access node; and
   responsive to changes in the signal condition, adjusting the quantity of transmission layers assigned to the wireless devices, wherein the adjusting the quantity of transmission layers comprises reducing the quantity of transmission layers in one or more increments if the signal condition has risen to meet one or more signal condition thresholds.

10. The system of claim 9, wherein the signal condition comprises a receive signal strength indicator (RSSI).

11. The system of claim 1, wherein the operations further comprise:
   determining that the signal condition falls to meet the one or more signal condition thresholds; and
   increasing the quantity of transmission layers in the one or more increments.

12. The system of claim 9, wherein adjusting the quantity of transmission layers is selectively performed for high powered wireless devices based on the signal condition staying between a first set of thresholds.

13. The system of claim 12, wherein adjusting the quantity of transmission layers is further selectively performed for standard and low powered wireless devices based on the signal condition exceeding the first set of thresholds.

14. A processing node for reducing uplink noise by limiting Multiple-In Multiple-Out (MIMO) transmission layers, the processing node being configured to perform operations comprising,
   determining that an uplink signal level received at an access node rises to meet a threshold; and
   selectively reducing a quantity of transmission layers assigned to high powered wireless devices attached to the access node based on the uplink signal level staying between a first set of thresholds.

15. The processing node of claim 14, wherein adjusting the quantity of transmission layers is further selectively performed for standard and low powered wireless devices based on the uplink signal level exceeding the first set of thresholds.

16. The processing node of claim 14, wherein the operations further comprise:
   monitoring the uplink signal level for a first carrier deployed by the access node; and
   reducing the quantity of transmission layers assigned to wireless devices attached to the first carrier.

17. The processing node of claim 16, wherein the first carrier is one of a primary carrier or a secondary carrier deployed by the access node using dual-connectivity.

* * * * *